United States Patent
Yan

(10) Patent No.: US 9,344,838 B2
(45) Date of Patent: May 17, 2016

(54) DATA TRANSMISSION METHOD AND APPARATUS, AND TERMINAL WITH TOUCH SCREEN

(71) Applicant: HUAWEI DEVICE CO.,LTD., Shenzhen (CN)

(72) Inventor: Shi Yan, Mexico City (MX)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/136,036

(22) Filed: Dec. 20, 2013

(65) Prior Publication Data

US 2014/0120840 A1    May 1, 2014

Related U.S. Application Data

(63) Continuation of application No. PCT/CN2013/081479, filed on Aug. 14, 2013.

(30) Foreign Application Priority Data

Aug. 14, 2012  (CN) .......................... 2012 1 0288366

(51) Int. Cl.
*H04B 7/00* (2006.01)
*H04W 4/00* (2009.01)
(Continued)

(52) U.S. Cl.
CPC ............. *H04W 4/008* (2013.01); *G06F 3/0486* (2013.01); *G06F 3/04817* (2013.01); *H04M 1/72519* (2013.01); *H04M 2250/22* (2013.01); *H04M 2250/64* (2013.01)

(58) Field of Classification Search
CPC .......... H04M 1/7253; H04M 2250/64; H04W 4/008; G06F 3/017; G06F 17/30165
USPC ............. 455/41.1, 41.2, 41.3, 517, 90.1, 90.2
See application file for complete search history.

(56) References Cited

U.S. PATENT DOCUMENTS 5,801,700 A     9/1998 Ferguson
8,725,113 B2 *  5/2014 Gargi et al. ................... 455/411
(Continued)

FOREIGN PATENT DOCUMENTS

CN          1912819 A      2/2007
CN          102215041 A    10/2011
(Continued)

OTHER PUBLICATIONS

Extended European Search Report dated Aug. 4, 2014 in corresponding European Patent Application No. 13792567.3.
(Continued)

*Primary Examiner* — Duc M Nguyen
(74) *Attorney, Agent, or Firm* — Staas & Halsey LLP

(57) ABSTRACT

A data transmission method and apparatus are disclosed, and a terminal with a touch screen. The method includes: when a touch on a file displayed on a touch screen is detected, determining whether an attribute of the touch meets a preset condition, where the attribute of the touch includes at least one of the following: a duration of touching the file, a track of dragging the file, and a final object location to which the file is dragged; and when the attribute of the touch meets the preset condition, transmitting the file to an object terminal through an established short-distance wireless communication data channel. Data transmission efficiency can be improved with the embodiments of the present invention.

13 Claims, 4 Drawing Sheets

(51) Int. Cl.
*G06F 3/0486* (2013.01)
*G06F 3/0481* (2013.01)
*H04M 1/725* (2006.01)

(56) References Cited

U.S. PATENT DOCUMENTS

| | | | |
|---|---|---|---|
| 2003/0220765 A1* | 11/2003 | Overy et al. | 702/158 |
| 2009/0140986 A1 | 6/2009 | Karkkainen et al. | |
| 2011/0081923 A1* | 4/2011 | Forutanpour et al. | 455/457 |
| 2011/0083111 A1* | 4/2011 | Forutanpour et al. | 715/863 |
| 2011/0237193 A1* | 9/2011 | Shen et al. | 455/41.2 |
| 2012/0054637 A1 | 3/2012 | Arrasvuori et al. | |
| 2012/0185520 A1 | 7/2012 | Iarocci et al. | |
| 2013/0050080 A1* | 2/2013 | Dahl et al. | 345/158 |

FOREIGN PATENT DOCUMENTS

| | | |
|---|---|---|
| CN | 102215208 A | 10/2011 |
| CN | 102333151 A | 1/2012 |
| CN | 102523346 A | 6/2012 |
| CN | 102685679 A | 9/2012 |
| CN | 102707880 A | 10/2012 |
| CN | 102832975 A | 12/2012 |
| KR | 10-2011-0063410 | 6/2011 |
| KR | 10-2012-0062929 | 6/2012 |
| WO | WO 2011/041434 A1 | 4/2011 |

OTHER PUBLICATIONS

International Search Report issued Oct. 31, 2013, in corresponding International Patent Application No. PCT/CN2013/081479.
Chinese Office Action issued Feb. 19, 2014, in corresponding Chinese Patent Application No. 201210288366.4.
Korean Office Action issued on Oct. 23, 2014 in corresponding Korean Patent Application No. 10-2013-7032910.
Hinckley et al., "Stitching: Pen Gestures that Span Multiple Displays", AVI'04, ACM, Gallipoli, Italy, 2004, pp. 1-9.
European Office Action dated May 12, 2015 in corresponding European Patent Application No. 13792567.3.

* cited by examiner

DATA TRANSMISSION METHOD AND APPARATUS, AND TERMINAL WITH TOUCH SCREEN

CROSS-REFERENCE TO RELATED APPLICATIONS

This application is a continuation of International Application No. PCT/CN2013/081479, filed on Aug. 14, 2013, which claims priority to Chinese Patent Application No. 201210288366.4, filed on Aug. 14, 2012, both of which are hereby incorporated by reference in their entireties.

TECHNICAL FIELD

Embodiments of the present invention relate to the field of wireless communication technologies and, in particular, to a data transmission method and apparatus, and a terminal with a touch screen.

BACKGROUND

With the development of technology, life and work may be recorded into data such as pictures, materials, music and videos. Sharing the data is an increasingly popular practice. The technology based on short-distance wireless communication is widely applied as a convenient and efficient data transmission technology; for example, the short-distance wireless communication technology such as Bluetooth and Wi-Fi technologies is widely applied.

Devices which support short-distance wireless communication may establish communication channels within a preset range and transmit data through the channels, data transmission based on the Bluetooth technology is taken as an example. Both device A and device B support the Bluetooth technology. After their Bluetooth functions are enabled, a user of device A and a user of device B have to manually establish the Bluetooth connection between the two devices. If device A needs to transmit file data to device B, after the user of device A chooses a file to be sent to device B, the user of device A still needs to manually make an option of "Sending by Bluetooth" in a menu and manually choose "Device B" as a object device; in this way, device A can send, to device B, the selected file to be sent.

Although data transmission in a short distance may be achieved in the method based on the short-distance wireless communication technology in the prior art, in the process of implementing data transmission by using the wireless communication technology, many manual operations are involved to complete data transmission, thereby affecting data transmission efficiency.

SUMMARY

The present invention provides a data transmission method and apparatus, and a terminal with a touch screen, to solve the problem in the prior art that many manual operations are involved to complete data transmission in the process of implementing data transmission by using a wireless communication technology and data transmission efficiency is affected.

To achieve the purposes, the present invention provides the following technical solutions:

In one aspect, a data transmission method applicable to a terminal with a touch screen includes:

when a touch on a file displayed on a touch screen is detected, determining whether an attribute of the touch meets a preset condition, where the attribute of the touch includes at least one of the following: a duration of touching the file, a track of dragging the file, and a final object location to which the file is dragged; and when the attribute of the touch meets a preset condition, transmitting the file to an object terminal through an established short-distance wireless communication data channel.

In a first implementation manner of the aspect, after determining that the attribute of the touch meets a preset condition and before transmitting the file to the object terminal through the established short-distance wireless communication data channel, the method further includes:

sending a file reception request indication to the object terminal; and when a file reception confirmation indication returned by the object terminal is received, performing the operation of transmitting the file to the object terminal through the established short-distance wireless communication data channel.

In combination with the aspect or the first possible implementation manner of the aspect, establishing the short-distance wireless communication data channel in a second possible implementation manner specifically includes:

when enabling of a short-distance wireless communication function is received, detecting the object terminal which enables the short-distance wireless communication function in a preset range; and generating the short-distance wireless communication data channel to the object terminal.

In combination with the first possible implementation manner of the aspect, establishing the short-distance wireless communication data channel in a third possible implementation manner specifically includes:

when enabling of a short-distance wireless communication function is received, detecting the object terminal which enables the short-distance wireless communication function object in a preset range and generating a short-distance wireless communication signaling channel; and triggering the generation of the short-distance wireless communication data channel to the object terminal through the short-distance wireless communication signaling channel object.

In another aspect, a data transmission apparatus applicable to a terminal with a touch screen includes:

a determining module, configured to, when a touch on a file displayed on a touch screen is detected, determine whether an attribute of the touch meets a preset condition, where the attribute of the touch includes at least one of the following: a duration of touching the file, a track of dragging the file, and a final location to which the file is dragged; and a file sending module, configured to, when a determining result of the determining module is yes, transmit the file to an object terminal through an established short-distance wireless communication data channel.

In combination with the aspect, the apparatus in a first possible implementation manner includes:

a command sending module, configured to, when a determining result of the determining module is yes, send a file reception request indication to the object terminal; and a command reception module, configured to trigger the file sending module when a file reception confirmation indication returned by the object terminal is received object.

In combination with the aspect or the first possible implementation manner of the aspect, in a second possible implementation manner, the apparatus further includes:

a module for establishing short-distance wireless data communication, configured to, when enabling of a short-distance wireless communication function is received, detect the object terminal which enables the short-distance wireless communication function in a preset range and generate the short-distance wireless communication data channel to the object terminal.

In combination with the aspect or the first possible implementation manner of the aspect, in a third possible implementation manner, the apparatus includes:

a module for establishing short-distance wireless data communication, configured to, when enabling of a short-distance wireless communication function is received, detect the object terminal which enables the short-distance wireless communication function in a preset range, generate a short-distance wireless communication signaling channel, and trigger the generation of the short-distance wireless communication data channel according to the short-distance wireless communication signaling channel.

An embodiment of the present invention further discloses a terminal with a touch screen, which includes any data transmission apparatus in the first, second, and third possible implementation manners of the another aspect of the apparatus.

As can be seen from the technical solutions, with the method provided by the embodiments of the present invention, when a terminal with a touch screen detects that the attribute of the touch on its screen meets a preset condition, the terminal with a touch screen determines that a chosen file needs to be transmitted to an object terminal through a short-distance wireless communication data channel, where the object terminal is a terminal which establishes the short-distance wireless communication data channel with the terminal with a touch screen. Therefore, in the entire process of data transmission, a transmission path and an object terminal do not need to be chosen manually, and the time delay incurred by manual operations does not exist, thereby improving data transmission efficiency. Furthermore, considerable manual operations do not need any more, so complexity of data transmission operations is reduced.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

For the purpose of citation and clarity, the description and abbreviations or acronyms of technical terms used herein are listed as follows:

NFC: Near Field Communication, near field communication technology;

Wi-Fi: Wireless fidelity, wireless fidelity.

Embodiment 1

Figure 1:
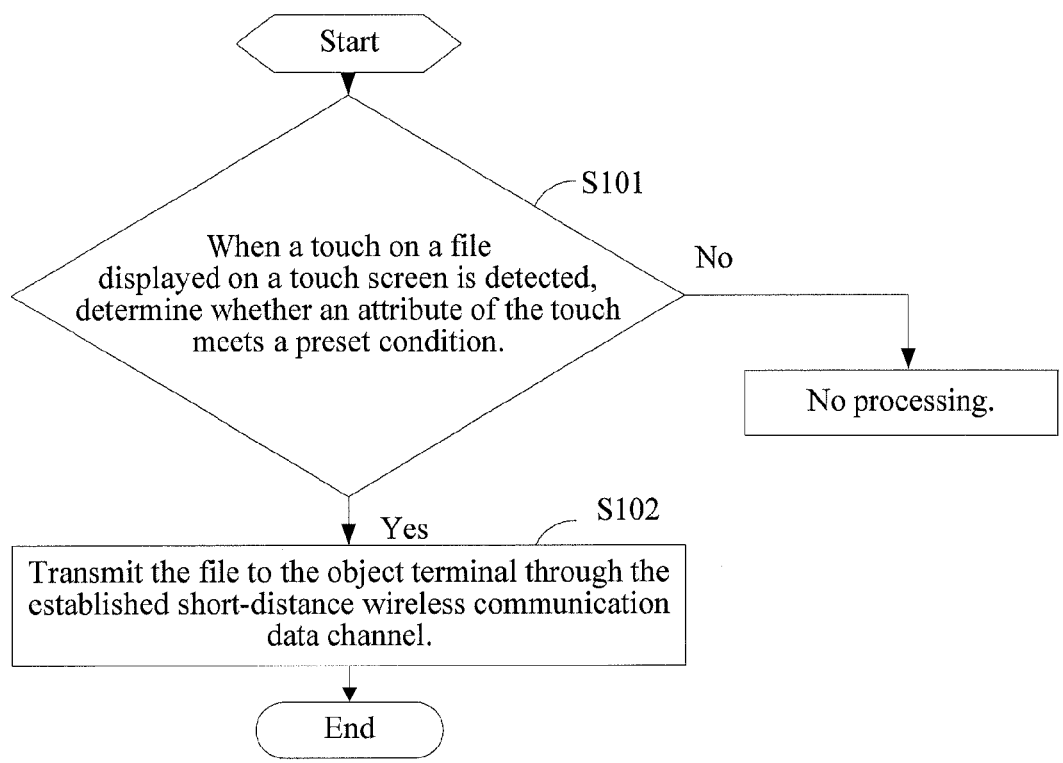
FIG. 1 is a flowchart of a first data transmission method according to an embodiment of the present invention.

Referring to FIG. 1, FIG. 1 is a flowchart of a first data transmission method according to an embodiment of the present invention. The method is applicable to a terminal with a touch screen, and the method includes:

Step S101: When a touch on a file displayed on a touch screen is detected, determine whether an attribute of the touch meets a preset condition. If yes, go to step S102. If no, no processing is made.

Displayed on the touch screen may be a file itself or its shortcut, which are herein referred to as a file.

The attribute of the touch includes at least one of the following: a duration of touching a file, a track of dragging the file, and a final location to which the file is dragged.

Accordingly, a preset condition may be at least one of the following: a duration of touching a file is no shorter than a preset duration, a track of dragging the file is a preset track, and a final location to which the file is dragged is a preset location.

Accordingly, determining whether the attribute of the touch meets the preset condition specifically is at least one of the following: determining whether the duration of touching a file is no shorter than a preset duration; determining whether a track of dragging the file is a preset track; and determining whether a final location to which the file is dragged is a preset location.

For instance, a preset duration may be 5s, a preset track may be "", "✓", or "○", and a preset location may be a margin of a touch screen, a center of the touch screen, or a specific location of the touch screen. A value of a preset duration, a value of a preset location, or a value of a preset track does not affect the implementation of the embodiment of the present embodiment, so no specific limit is made herein.

When the attribute of the touch meets a preset condition, a terminal with a touch screen uses the file as a file to be sent, a transmission path is a "short-distance wireless communication data channel", and an object terminal is a terminal which establishes the short-distance wireless communication data channel with the terminal with a touch screen object.

If a terminal with a touch screen has a plurality of short-distance wireless communication functions enabled, for instance, Bluetooth, NFC, WiFi, and the like, the terminal with a touch screen may establish a connection with a corresponding terminal through each of the short-distance wireless communication functions. Assuming that the terminal with a touch screen establishes short-distance wireless communication data channel 1 with terminal A by Bluetooth, the terminal with a touch screen establishes short-distance wireless communication data channel 2 with terminal B by NFC, and the terminal with a touch screen establishes short-distance wireless communication data channel 3 with terminal C by Wi-Fi. If a preset duration is larger than 5s and smaller than 10s (and/or a preset track is "", and/or a preset location is the margin of the touch screen), a system of the terminal with a touch screen may determine that the transmission path of the file is "short-distance wireless communication data channel 1", and an object terminal is "terminal A". If a preset duration is larger than 10s and smaller than 20s (and/or a preset track is "✓", and/or a preset location is the center of the touch screen), a system of the terminal with a touch screen determines that the transmission path of the file is "short-distance wireless communication data channel 2", and an object terminal is "terminal B". If a preset duration is larger than 20s (and/or a preset track is "○", and/or a preset location is a specific location of the touch screen), a system of the terminal with a touch screen determines that the transmission path of the file is "short-distance wireless communication data channel 3", and an object terminal is "terminal C". That is, a preset condition and a short-distance wireless communication data channel are in one-to-one correspondence.

In FIG. 1, "If no, no processing is made" indicates that processing may be possible in other conditions, for example, determining whether other conditions are met.

Step S102: Transmit the file to the object terminal through the established short-distance wireless communication data channel.

The method for establishing a short-distance wireless communication data channel may also be the prior art. For instance, a terminal with a touch screen and an object terminal both enable their respective Bluetooth functions, and the terminal with a touch screen is manually matched with the object terminal, to establish a Bluetooth channel between the terminal with a touch screen and an object terminal.

According to the embodiment of the present invention, when the terminal with a touch screen detects that the attribute of the touch on its screen meets a preset condition, a terminal with a touch screen determines that a chosen file needs to be transmitted to an object terminal through a short-distance wireless communication data channel, where the object terminal is a terminal which establishes the short-distance wireless communication data channel with the terminal with a touch screen. Therefore, in the entire process of data transmission, a transmission path and an object terminal do not need to be chosen manually, and the object time delay incurred by manual operations does not exist, thereby improving data transmission efficiency. Furthermore, considerable manual operations do not need any more, so complexity of data transmission operations is reduced.

Embodiment 2

Figure 2:
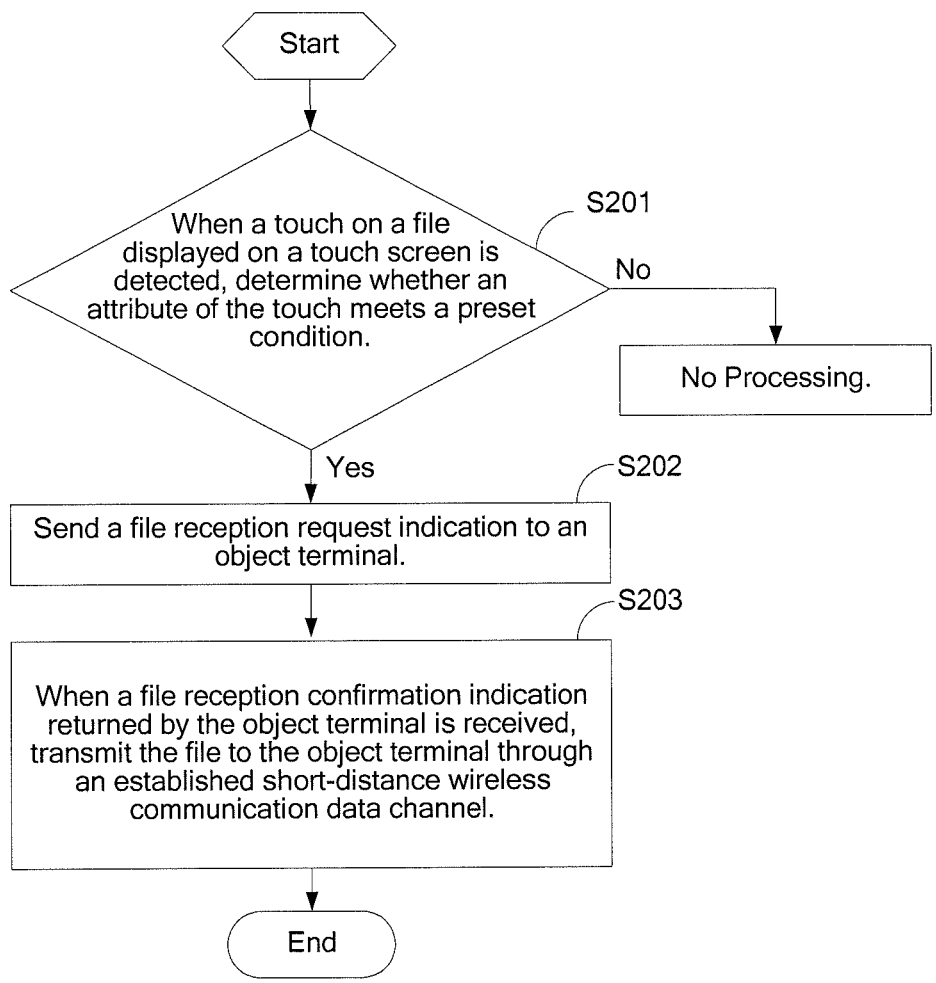
FIG. 2 is a flowchart of a second data transmission method according to an embodiment of the present invention.

Referring to FIG. 2, FIG. 2 is a flow chart of a second data transmission method according to an embodiment of the present invention. The method includes the following:

Step S201: When a touch on a file displayed on a touch screen is detected, determine whether an attribute of the touch meets a preset condition. If yes, go to step S202. If no, no processing is made. In FIG. 2, "If no, no processing is made" indicates that processing may be possible in other conditions, for example, determining whether other conditions are met.

Step S202: Send a file reception request indication to an object terminal.

Step S203: When a file reception confirmation indication returned by the object terminal is received, transmit the file to the object terminal through an established short-distance wireless communication data channel.

If the object terminal is a terminal which has a touch screen, by touching any part of the touch screen of the object terminal, it can be indicated that the object terminal needs to receive a file. Of course, the object terminal may also be a terminal with no touch screen, and in this case, it suffices to click a receive button or a reject button.

In addition to having the beneficial effects of Embodiment 1, the embodiment of the present invention queries whether an object terminal needs to receive a file object before sending the file to the object terminal, thereby preventing the object terminal from passively receiving some garbage files.

The methods for establishing a short-distance wireless communication data channel in Embodiment 1 and Embodiment 2 include the following methods.

Embodiment 3

Figure 3:
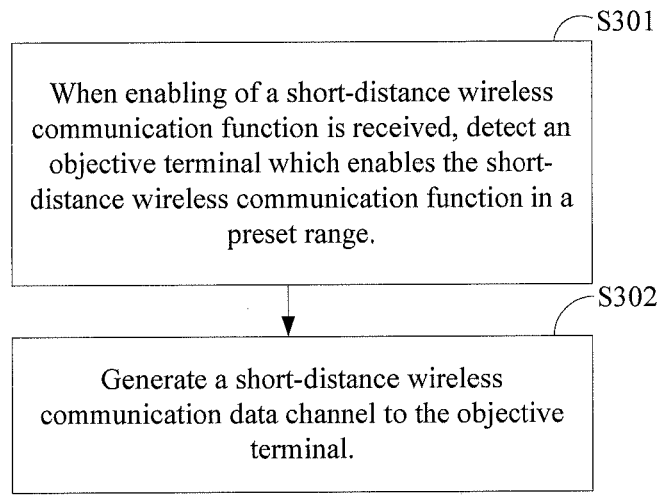
FIG. 3 is a flowchart of a first method for establishing a short-distance wireless data channel according to an embodiment of the present invention.

Referring to FIG. 3, FIG. 3 is a flowchart of a first method for establishing a short-distance wireless communication data channel according to an embodiment of the present invention, and the method includes:

Step S301: When enabling of a short-distance wireless communication function is received, detect an object terminal which enables the short-distance wireless communication function in a preset range.

Before a short-distance wireless communication data channel is established between a terminal with a touch screen and an object terminal, the terminal with a touch screen and the object terminal must be put within a communication distance range of a short-distance wireless communication technology. The short-distance wireless communication technologies include a Bluetooth technology, a Wi-Fi technology, and a NFC technology.

Because every short-distance wireless communication technology has its communication distance range, after a terminal with a touch screen enables a short-distance wireless communication function, it may only search for an object terminal which enables a short-distance wireless communication function and is located in a communication distance range. For instance, a communication distance range of the NFC technology is 10 cm, if a distance between a terminal with a touch screen and an object terminal exceeds 10 cm, the terminal with a touch screen cannot find the object terminal.

Establishment of a short-distance wireless communication channel may be initiated by either a terminal with a touch screen or an object terminal.

Step S302: Generate a short-distance wireless communication data channel to the object terminal.

Specifically, after a terminal with a touch screen detects an object terminal, the terminal with a touch screen sends local wireless communication information to the object terminal and receives object wireless communication information of the object terminal. The local wireless communication information includes a local short-distance wireless data communication protocol. The object wireless communication information object includes a short-distance wireless data communication protocol of the object terminal. A short-distance wireless communication data channel is generated according to the local wireless communication information and the object wireless communication information object. After the terminal with a touch screen and the object terminal exchange their respective wireless communication information, a WAP2 key may be generated, and a short-distance wireless communication data channel may be generated through the WAP2 key. The process of generating a WAP2 key is the prior art, and details are not described herein.

In the process of establishing a short-distance wireless communication data channel, a manual operation is only required in enabling a short-distance wireless communication function, and the rest is established by a terminal with a touch screen and an object terminal without the need of manual operations.

Step S302 may be before step S101, or between step S101 and step S102. Step S302 may be before step S201 or step S202, or between step S201 and step S202, or between step S202 and step S203.

Embodiment 4

Figure 4:
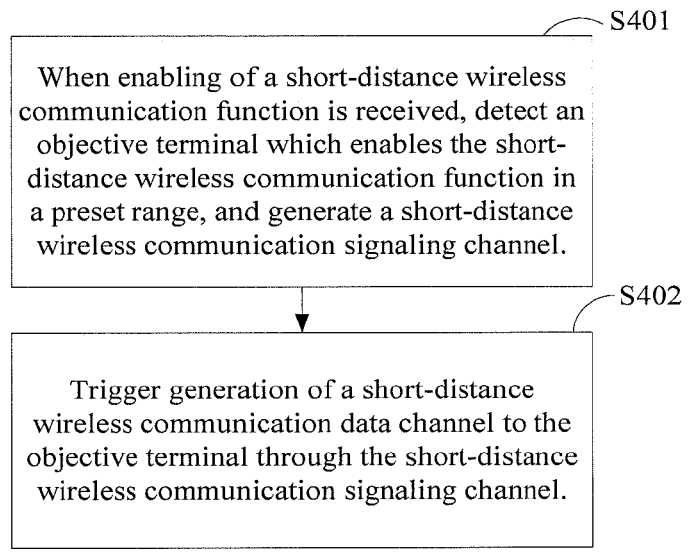
FIG. 4 is a flowchart of a second method for establishing a short-distance wireless data channel according to an embodiment of the present invention.

Referring to FIG. 4, FIG. 4 is a flowchart of a second method for establishing a short-distance wireless data channel according to an embodiment of the present invention. The method includes:

Step S401: When enabling of a short-distance wireless communication function is received, detect an object terminal which enables the short-distance wireless communication function in a preset range, and generate a short-distance wireless communication signaling channel;

Step S402: Trigger generation of a short-distance wireless communication data channel to the object terminal through the short-distance wireless communication signaling channel.

Specifically, through the short-distance wireless communication signaling channel, local wireless communication information may be sent to the object terminal and object wireless communication information of the object terminal may be received. The local wireless communication information includes a local short-distance wireless data communication protocol. The object wireless communication information object includes a short-distance wireless data communication protocol of the object terminal. The short-distance wireless communication data channel may be generated according to the local wireless communication information and the object wireless communication information object. A WAP2 key may be generated after the object terminal and a terminal with a touch screen exchange their respective wireless communication information. Establishment of the short-distance wireless communication data channel to the object terminal may be triggered according to the WAP2 key; for instance, a short-distance wireless communication data channel such as Bluetooth is established by using NFC.

The short-distance wireless communication signaling channel and the short-distance wireless communication data channel may be established based on different communication protocols.

Step S402 may be before step S102 or step S203. Step S402 may be before step S101 or between step S101 and step S102. Step S402 may be before step S201 or step S202, or between step S201 and step S202, or between step S202 and step S203.

An example is used to describe the embodiment so that a person skilled in the art understands the embodiment of present invention more clearly.

Assuming that a user of terminal A with a touch screen needs to send a file to terminal B with a touch screen object, after terminal A and terminal B are put within a communication distance range and have their NFC functions enabled, terminal A and terminal B may discover each other, and in this case, an NFC channel is established as a short-distance wireless communication signaling channel. Terminal A and terminal B exchange their respective wireless communication information through the NFC channel, to establish a Wi-Fi channel as a short-distance wireless communication data channel. When the user of terminal A touches a file displayed on the touch screen of terminal A, terminal A may detect the attribute of the touch on the file. If the attribute of the touch meets a preset condition, terminal A obtains the relevant information of the file and queries terminal B through the NFC channel whether terminal B receives the file. If the user of terminal B agrees, any location or a preset location of the touch screen of terminal B is touched to indicate confirmation of reception. Terminal B sends, through the NFC channel, a file reception confirmation indication to terminal A. When terminal A receives the file reception confirmation indication, terminal A sends the file to terminal B through the Wi-Fi channel.

After terminal A and terminal B exchange their respective wireless communication information through the NFC channel, a WAP2 key may be generated randomly, to ensure communication security and establish a Wi-Fi channel.

The Wi-Fi channel may be established after terminal A receives the file reception confirmation indication and before terminal A sends a file to terminal B.

In the embodiment, it is also possible that a Wi-Fi channel is not established as a short-distance wireless communication data channel, but an NFC channel is used as a short-distance wireless communication signaling channel and a short-distance wireless communication data channel.

Persons skilled in the art may understand that a Wi-Fi channel which is established through an NFC channel is only used as an example, which does not limit the method for establishing a short-distance wireless communication data channel between terminal A and terminal B. There are various methods for establishing a short-distance wireless communication data channel between terminal A and terminal B, for example, a Bluetooth channel established by using an NFC channel.

The method is described in detail in the embodiment of the present invention. The method of the present invention may be implemented by using multiple forms of apparatuses. Therefore, the present invention further discloses two apparatuses. Detailed description is provided in the following specific embodiments.

Embodiment 5

Figure 5:
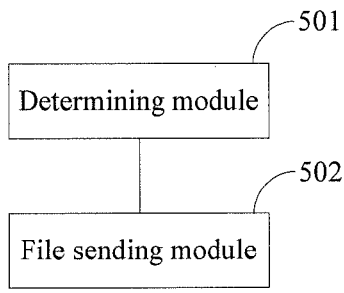
FIG. 5 is a structural schematic diagram of a first data transmission apparatus according to an embodiment of the present invention.

Referring to FIG. 5, FIG. 5 is a structural schematic diagram of a first data transmission apparatus according to an embodiment of the present invention. The apparatus is applicable to a terminal with a touch screen, and the apparatus may include: a determining module 501 and a file sending module 502.

The determining module 501 is configured to: when a touch on a file displayed on a touch screen is detected, determine whether an attribute of the touch meets a preset condition.

Displayed on the touch screen may be a file itself or its shortcut, which are herein referred to as a file.

The attribute of the touch includes at least one of the following: a duration of touching the file, a track of dragging the file, and a final location to which the file is dragged.

Specifically, determining whether the attribute of the touch meets the preset condition includes: determining whether the duration of touching the file is no shorter than a preset duration, determining whether the track of dragging the file is a preset track, and determining whether a final location to which the file is located is a preset location.

The file sending module 502 is configured to: when a determining result of the determining module 501 is yes, send the file to an object terminal through an established short-distance wireless communication data channel.

According to the embodiment of the present invention, when the determining module 501 determines that the attribute of the touch on the screen of a terminal with a touch screen meets a preset condition, the file sending module 502 determines that a chosen file needs to be transmitted to an object terminal through a short-distance wireless communication data channel corresponding to the preset condition, where the object terminal is a terminal which establishes the short-distance wireless communication data channel with the terminal with a touch screen. Therefore, object in the entire process of data transmission, a transmission path and an object terminal do not need to be chosen manually, and the object time delay incurred by manual operations does not exist, thereby improving data transmission efficiency. Furthermore, considerable manual operations do not need any more, so complexity of data transmission operations is reduced.

Embodiment 6

Figure 6:
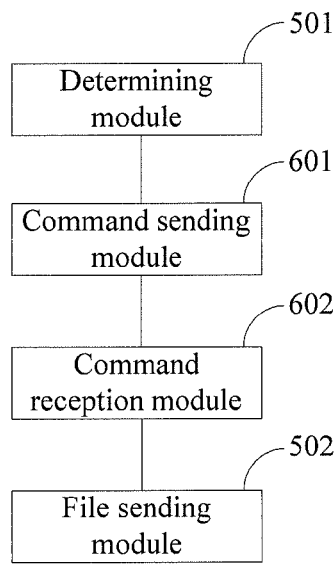
FIG. 6 is a structural schematic diagram of a second data transmission apparatus according to an embodiment of the present invention.

Referring to FIG. 6, FIG. 6 is a structural schematic diagram of a second data transmission apparatus according to the embodiment of the present invention. The apparatus is applicable to a terminal with a touch screen, and the apparatus may include: a determining module 501 and a command sending module 601, a command reception module 602, and a file sending module 502.

The determining module 501 is configured to: a touch on a file displayed on a touch screen is detected, determine whether an attribute of the touch meets a preset condition, where the attribute of the touch includes at least one of the following: a duration of touching the file, a track of dragging the file, and a final location to which the file is dragged.

The command sending module 601 is configured to: when a determining result of the determining module is yes, send a file reception request indication to an object terminal.

The command reception module 602 is configured to: when a file reception confirmation indication returned by the object terminal is received object, trigger the file sending module.

The file sending module 502 is configured to: when a determining result of the determining module 501 is yes, send the file to an object terminal through an established short-distance wireless communication data channel.

In addition to the beneficial effects of Embodiment 5, the embodiment of the present invention has the following effects: before a file is sent to the object terminal, the command sending module 601 queries an object terminal whether the object terminal needs to receive the file, and only when the command reception module 602 receives a file reception confirmation indication returned by the object terminal, the file sending module 502 sends the file to the object terminal, thereby preventing the object terminal from passively receiving some garbage files.

A short-distance wireless communication data channel in the apparatus embodiment is established by a module for establishing short-distance wireless data communication. The function of the module for establishing short-distance wireless data communication may be: when enabling of a short-distance wireless communication function is received, detecting an object terminal which enables the short-distance wireless communication function in a preset range, and generating a short-distance wireless communication data channel to the object terminal; or the function of the module for establishing short-distance wireless data communication may be: when enabling of a short-distance wireless communication function is received, detecting an object terminal which enables the short-distance wireless communication function in a preset range, generating a short-distance wireless communication signaling channel, and triggering the generation of a short-distance wireless communication data channel according to the short-distance wireless communication signaling channel.

Embodiment 7

Figure 7:
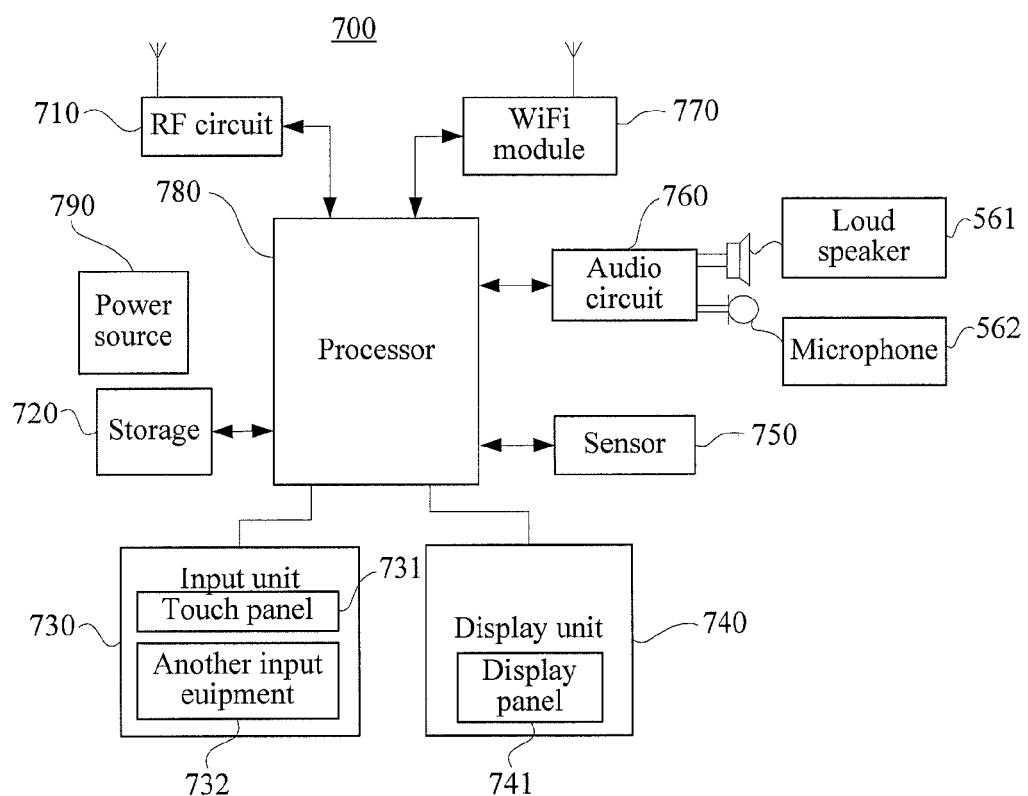
FIG. 7 is a structural schematic diagram of a data transmission system according to an embodiment of the present invention.

An embodiment of the present invention further provides a data transmission system, which may be a terminal device such as a mobile phone, a tablet computer, a PDA (Personal Digital Assistant, personal digital assistant), a POS (Point of Sales, point of sales terminal), and a vehicle-mounted computer. A mobile phone is taken as an example. FIG. 7 is a block diagram of part of a mobile phone 700 related to a system provided in this embodiment of the present invention. As shown in FIG. 7, the mobile phone 700 has components such as an RF (Radio Frequency, radio frequency) circuit 710, a storage 720, an input unit 730, a display unit 740, a sensor 750, an audio circuit 760, a WiFi (wireless fidelity, wireless fidelity) module 770, a processor 780, and a power source 790. Persons skilled in the art may understand that, the structure of the mobile phone shown in FIG. 7 is only an example of implementation, which does not impose limitation to the mobile phone; and the structure may include components more or less than those shown in the drawing, or may combine some components, or may have different component deployment.

Components of the mobile phone 700 are specifically illustrated in the following with reference to FIG. 7.

The RF circuit 710 may be configured to receive and send information, or receive and send a signal during calls, or in particular, receive downlink information of a base station and send it to the processor 780 for processing. In addition, the RF circuit 700 sends designed uplink data to the base station. Generally, the RF circuit includes, but not limited to, an antenna, at least one amplifier, a transceiver, a coupler, an LNA (Low Noise Amplifier, low noise amplifier), and a duplexer. Furthermore, the RF circuit 710 may communicate with another equipment through wireless communication and a network. The wireless communication may adopt any communication standard or protocol, including, but not limited to, GSM (Global System of Mobile communication, global system of mobile communication), GPRS (General Packet Radio Service, general packet radio service), CDMA (Code Division Multiple Access, code division multiple access), WCDMA (Wideband Code Division Multiple Access, wideband code division multiple access), LTE (Long Term Evolution, long term evolution), electronic mail, and SMS (Short Messaging Service, short message service).

The storage 720 may be configured to store a software program and module. The processor 780 executes various function applications and data processing of the mobile phone 700 by running the software program and module stored in the storage 720. The storage 720 may mainly include a program storage area and a data storage area, where the program storage area may store an operating system, an application required by at least one function (such as a sound playing function and an image playing function), and so on; and the data storage area may store data created according to the use of the mobile phone 700 (such as audio data and a telephone book), and so on. Moreover, the storage 720 may include a high-speed random-access memory, and may further include a nonvolatile storage; such as at least one magnetic disk memory, a flash memory, or other volatile solid memory.

The input unit 730 may be configured to receive an input number or character information, and generate key signal input related to user setting and function control of the mobile phone 700. Specifically, the input unit 730 may include a touch panel 731 and another input equipment 732. The touch panel 731, also referred to as a touch screen, may collect a touch operation of a user on the panel or nearby (for example, an operation of the user on the touch panel 731 or near the touch panel 731 by using any suitable object or attachment such as a finger or a touch pen), and drive a corresponding connection device according to a preset program. Optionally, the touch panel 571 may include two parts: a touch detection device and a touch controller. The touch detection device detects a touch direction of the user, detects a signal brought by a touch operation, and transmits the signal to the touch controller. The touch controller receives touch information from the touch detection device, converts the touch information to coordinates of a touch point, and sends the coordinates of the touch point to the processor 780. The touch controller may receive a command sent by the processor 780 and execute the command. Moreover, the touch panel 731 may be implemented in various types such as a resistance-type, a capacitance-type, an infrared type, and a surface acoustic wave type. In addition to the touch panel 731, the input unit 730 may further include another input equipment 732. Specifically, the another input equipment 732 may include, but not limited to, at least one of the following: a physical keyboard, a functional key (such as a volume control key and a switch key), a trackball, a mouse, an operating level, and the like.

The display unit 740 may be configured to display information input by a user or information provided to a user, and various menus of the mobile phone 700. The display unit 740 may include a display panel 741, and optionally, may use a form such as an LCD (Liquid Crystal Display, liquid crystal display) or an OLED (Organic Light-Emitting Diode, organic light-emitting diode) to configure the display panel 741. Further, the touch panel 731 may cover the display panel 741. When the touch panel 731 detects the touch operation on the panel or nearby, the touch panel 731 transmits the touch operation to the processor 780 to determine a type of the touch event, and then the processor 780 provides corresponding visual output on the display panel 741. In FIG. 7, the touch panel 731 and the display panel 741 are used as two independent components to implement the input and output functions of the mobile phone 700; however, in some embodiments, the touch panel 731 and the display panel 741 may be integrated to implement the input and output functions of the mobile phone 700.

The mobile phone 700 may further include at least one sensor 750, such as an optical sensor, a motion sensor, and other sensors. Specifically, the optical sensor may include an ambient light sensor and a proximity sensor. The ambient light sensor may adjust the brightness of the display panel 741 according to the brightness of ambient light; and the proximity sensor may close the display panel 741 and/or backlight when the mobile phone 700 is moved to an ear. As a type of motion sensor, an accelerometer sensor may detect acceleration values in various directions (generally in three axes), may detect the value and direction of the gravity when the sensor stays still, and may be configured to identify an application of a gesture of the mobile phone (for example, switching between a landscape mode and a vertical screen mode, a related game, and magnetometer gesture correction), a vibration identification related function (such as a pedometer, and a knock), and so on. The mobile phone 700 may be further configured with other sensors such as a gyroscope, a barometer, a hygrometer, a thermometer, and an infrared sensor, which are not detailed herein.

The audio circuit 760, a loud speaker 761 and a microphone 762 may provide audio interfaces between a user and the mobile phone 700. The audio circuit 760 may transmit an electric signal converted from received audio data to the loudspeaker 761, and the loudspeaker 761 converts the electric signal to a sound signal for output. On the other hand, the microphone 762 converts a collected sound signal into an electric signal, the audio circuit 760 receives the electric signal, converts the electric signal into audio data, and output the audio data to the processor 780 for processing, and the data after the processing is sent to, for example, another mobile phone through the RF circuit 710, or the audio data is output to the storage 720 for further processing.

WiFi belongs to a short-distance wireless transmission technology. The mobile phone 700 may help a user receive and send emails, browse web pages, access stream media, and so on through a WiFi module 770. WiFi provides wireless broadband Internet access for a user and it may also be used for the short-distance communication between two mobile phones. FIG. 7 shows a WiFi module 770; however, it should be understood that the WiFi module is not a mandatory component of the mobile phone 700, and may be omitted as required without changing the essence of the present invention.

The processor 780 is a control center of the mobile phone 700, connects various parts of the whole mobile phone by using various interfaces and lines, and executes various functions and processes data in the mobile phone 700 by running or executing a software program and/or module stored in the storage 720 and invoking the data stored in the storage 720, so as to perform integral monitoring for the mobile phone. Optionally, the processor 780 may include one or more processing units; preferably, the processor 780 may integrate an application processor and a modem processor. The application processor mainly processes an operating system, a user interface, an application, and so on, and the modem processor mainly processes wireless communication. It should be understood that, the modem processor may also not be integrated in the processor 780.

The mobile phone 700 further includes a power source 790 (for example, a battery) supplying power for various parts. Preferably, the power source may be logically connected to the processor 780 through a power source management system, to implement management of functions such as charging, discharging, and power consumption management through the power source management system.

Although not shown, the mobile phone 700 may further include a camera, a Bluetooth module, and so on, which are not detailed herein.

In the embodiment of the present invention, the mobile phone 700 has at least one short-distance wireless communication module, for example, a WiFi module, a Bluetooth module, or an NFC module.

In the embodiment of the present invention, the processor included in the system has the following functions: when a touch on a file displayed on a touch screen is detected, determining whether an attribute of the touch meets a preset condition, where the attribute of the touch includes at least one of the following: a duration of touching the file, a track of dragging the file, and a final object location to which the file is dragged; and when the attribute of the touch meets the preset condition, transmitting the file to an object terminal through an established short-distance wireless communication data channel.

In the embodiment of the present invention, the storage included in the system stores the preset condition and the correspondence between the preset condition and the short-distance wireless communication data channel.

The preset condition may be at least one of the following: a duration of touching a file is no shorter than a preset duration, a track of dragging the file is a preset track, and a final location to which the file is dragged is a preset location.

According to the embodiment of the present invention, when the processor detects that the attribute of the touch on a screen meets a preset condition in the storage, the processor determines that a chosen file needs to be transmitted to an object terminal through a short-distance wireless communication data channel corresponding the preset condition, where the object terminal is a terminal which establishes the short-distance wireless communication data channel with the terminal with a touch screen. Therefore, the object in the entire process of data transmission, a transmission path and an object terminal do not need to be chosen manually, and the object time delay incurred by manual operations does not exist, thereby improving data transmission efficiency. Furthermore, considerable manual operations do not need any more, so complexity of data transmission operations is reduced.

An embodiment of the present invention further provides a terminal with a touch screen, and the terminal includes any of the apparatuses.

All embodiments in the specification are described in a progressive manner. The focus in one embodiment is different from the focus in another embodiment. For the similar parts among embodiments, reference may be made to the relevant parts. The apparatus disclosed in embodiments is corresponding to the method disclosed in embodiments, so description is simple. For the related parts, reference may be made to the description in the method embodiments.

It should be noted that, the terms "include", "contain", and any variation thereof are intended to cover a non-exclusive inclusion. Therefore, in the context of a process, method, object, or device that includes a series of elements, the process, method, object, or device not only includes such elements, but also includes other elements not specified expressly, or further include inherent elements of the process, method, object, or device. If no more limitations are made, an element limited by "include a/an . . . " does not exclude other same elements existing in the process, the method, the article, or the device which includes the element.

The methods or algorithm steps described herein may be implemented by using hardware directly or by using a software module executed by a processor, or by using both of them. The software module may be located in a Random Access Memory (RAM), a computer memory, a Read Only Memory (ROM), an Electrically Programmable ROM, an Electrically Erasable Programmable ROM, a register, a hard disk, a removable disk, a CD-ROM, or any other storage media well-known in the art.

The preceding description disclosed in the embodiments allows a person skilled in the art to implement or use the present invention. Various modifications made to these embodiments are apparent for a person skilled in the art. The general principle defined in the present invention may be implemented in other embodiments without departing from the idea or scope of the present invention. Therefore, the present invention will not be limited to the embodiments described in the document but extends to the widest scope that complies with the principle and novelty disclosed in the document.

The invention claimed is:

1. A data transmission method applicable to a terminal with a touch screen, comprising:
when a touch on a file displayed on a touch screen is detected, determining whether an attribute of the touch meets a preset condition, wherein the attribute of the touch comprises at least one of the following: a duration of touching the file, a track of dragging the file, and a final object location to which the file is dragged;
based upon the preset condition, selecting a short-distance wireless communication data channel from among a plurality of short-distance wireless communication data channels in communication with an object terminal, and establishing the short-distance wireless communication data channel with the object terminal; and
transmitting the file to the object terminal through the established short-distance wireless communication data channel, when the attribute of the touch meets the preset condition, wherein the preset condition and the short-distance wireless communication data channel are in one-to-one correspondence with each other.

2. The method according to claim 1, wherein after the determining that the attribute of the touch meets the preset condition and before the transmitting the file to the object terminal through the established short-distance wireless communication data channel, the method further comprises:
sending a file reception request indication to the object terminal; and
when a file reception confirmation indication returned by the object terminal is received, performing the operation of transmitting the file to the object terminal through the established short-distance wireless communication data channel.

3. The method according to claim 2, wherein establishing the short-distance wireless communication data channel specifically comprises:
when enabling of a short-distance wireless communication function is received, detecting the object terminal which enables the short-distance wireless communication function in a preset range; and
generating the short-distance wireless communication data channel to the object terminal.

4. The method according to claim 2, wherein establishing the short-distance wireless communication data channel specifically comprises:
when enabling of a short-distance wireless communication function is received, detecting the object terminal which enables the short-distance wireless communication function in a preset range and generating a short-distance wireless communication signaling channel; and
triggering generation of the short-distance wireless communication data channel to the object terminal through the short-distance wireless communication signaling channel.

5. The method according to claim 1, wherein establishing the short-distance wireless communication data channel specifically comprises:
when enabling of a short-distance wireless communication function is received, detecting the object terminal which enables the short-distance wireless communication function in a preset range; and
generating the short-distance wireless communication data channel to the object terminal.

6. A terminal with a touch screen, comprising:
a processor; and
a touch screen, wherein the processor is configured to detect a touch on a file displayed on the touch screen, determine whether an attribute of the touch meets a preset condition, wherein the attribute of the touch comprises at least one of the following: a duration of touching the file, a track of dragging the file, and a final object location to which the file is dragged, based upon the preset condition, select a short-distance wireless communication data channel from among a plurality of short-distance wireless communication data channels in communication with an object terminal, establish the short-distance wireless communication data channel with the object terminal, and transmit the file to the object terminal through the established short-distance wireless communication data channel, when the attribute of the touch meets the preset condition wherein the preset condition and the short-distance wireless communication data channel are in one-to-one correspondence with each other.

7. The terminal according to claim 6, wherein after the determining that the attribute of the touch meets the preset condition and before the transmitting the file to the object terminal through the established short-distance wireless communication data channel, the processor further is configured to:
    send a file reception request indication to the object terminal; and
    when a file reception confirmation indication returned by the object terminal is received, perform the operation of transmitting the file to the object terminal through the established short-distance wireless communication data channel.

8. The terminal according to claim 7, wherein the processor further is configured to detect the object terminal which enables the short-distance wireless communication function in a preset range when enabling of a short-distance wireless communication function is received, and generate the short-distance wireless communication data channel to the object terminal.

9. The terminal according to claim 7, wherein establishing the short-distance wireless communication data channel specifically comprises:
    the processor further is configured to detect the object terminal which enables the short-distance wireless communication function in a preset range and generating a short-distance wireless communication signaling channel when enabling of a short-distance wireless communication function is received, and trigger generation of the short-distance wireless communication data channel to the object terminal through the short-distance wireless communication signaling channel.

10. The terminal according to claim 6, wherein the processor further is configured to detect the object terminal which enables the short-distance wireless communication function in a preset range when enabling of a short-distance wireless communication function is received, and generate the short-distance wireless communication data channel to the object terminal.

11. A data transmission system, comprising:
    a processor;
    a storage; and
    a touch screen, wherein the processor is configured to when a touch on a file displayed on the touch screen is detected, determine whether an attribute of the touch meets a preset condition, where the attribute of the touch includes at least one of the following: a duration of touching the file, a track of dragging the file, and a final object location to which the file is dragged; and when the attribute of the touch meets the preset condition, based upon the preset condition, select a short-distance wireless communication data channel from among a plurality of short-distance wireless communication data channels in communication with an object terminal, establish the short-distance wireless communication data channel with the object terminal and transmit the file to the object terminal through the established short-distance wireless communication data channel;
    the storage is configured to store the preset condition and the correspondence between the preset condition and the short-distance wireless communication data channel, wherein the preset condition and the short-distance wireless communication data channel are in one-to-one correspondence with each other.

12. The system according to claim 11, wherein the preset condition is at least one of the following: a duration of touching a file is no shorter than a preset duration, a track of dragging the file is a preset track, and a final location to which the file is dragged is a preset location.

13. The system according to claim 11, wherein when the processor detects that the attribute of the touch on a screen meets a preset condition in the storage, the processor is configured to determine that a chosen file needs to be transmitted to an object terminal through a short-distance wireless communication data channel corresponding the preset condition, where the object terminal is a terminal which establishes the short-distance wireless communication data channel with the terminal with the touch screen.

* * * * *